Figure 1:
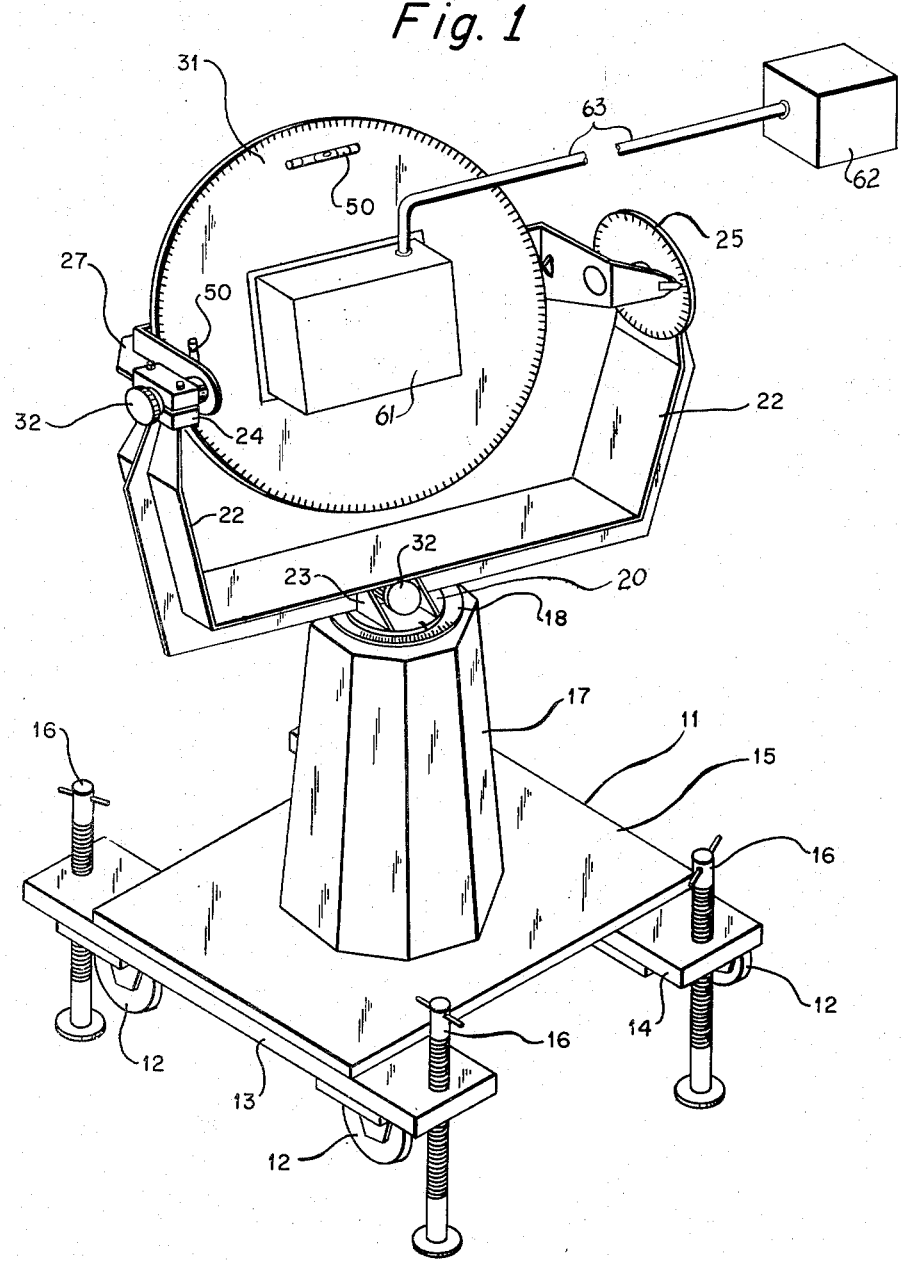

INVENTOR.
CLARENCE RUSSELL MCNUTT
BY
ATTORNEYS

United States Patent Office 2,761,306
Patented Sept. 4, 1956

2,761,306

UNIVERSAL TILT TABLE FOR CALIBRATING INSTRUMENTS

Clarence Russell McNutt, Philadelphia, Pa.

Application June 11, 1954, Serial No. 436,260

5 Claims. (Cl. 73—1)

(Granted under Title 35, U. S. Code (1952), sec. 266)

The invention described herein may be manufactured and used by or for the Government of the United States of America for governmental purposes without the payment of any royalties thereon or therefor.

The present invention relates to a universal tilt table for pre-calibrating aeronautical instruments and particularly for pre-calibrating position sensitive equipment utilized in automatic control systems for drone aircraft without recourse to flight testing. The instant invention provides facilitated simulation on the ground of various attitudes assumed by an aircraft in flight, and the device embodied in this invention comprises an auxiliary connecting means for operatively interconnecting the position sensitive equipment with the remainder of the automatic control system and a portable universally adjustable supporting assembly for adjustably supporting the equipment to be calibrated which is normally mounted fixedly within an aircraft and displaced therewith in flight.

In the absence of the means described below and its use in the manner described herein, it was customary to perform this pre-calibrating work during flight tests necessarily involving the expenditure of considerable time and effort and occasionally exposing flight test personnel to serious hazards. Prior to such calibration flights, the best that could be accomplished on the ground was a rough approximation of the proper settings.

The present invention contemplates a reliable and inexpensive procedure for pre-calibrating equipment for installation in aircraft while the aircraft is on the ground and further contemplates a compact portable universally adjustable supporting means for equipment to be pre-calibrated by this procedure, said supporting means being designed to facilitate its movement into and use in an area adjacent to an aircraft positioned on the ground, and auxiliary means for temporarily operably interconnecting the component to be calibrated and the remainder of the system remaining in the aircraft.

An object of the present invention is the provision of means for implementing an improved procedure for pre-calibrating complex aeronautical equipment normally installed in an aircraft.

Another object of the invention is the provision of a universally adjustable supporting assembly to which equipment may be fixedly secured during the pre-calibrating procedure in this invention.

Still another object is to provide a compact universally adjustable supporting assembly including an equipment supporting element which may be moved to any one of innumerable positions about three mutually perpendicular axes.

A final object of the present invention is the provision of a universally adjustable supporting means for equipment to be pre-calibrated arranged to be moved in various directions and at rates simulating the movement to which such equipment would be subjected during flight maneuvers of an aircraft.

Figure 2:
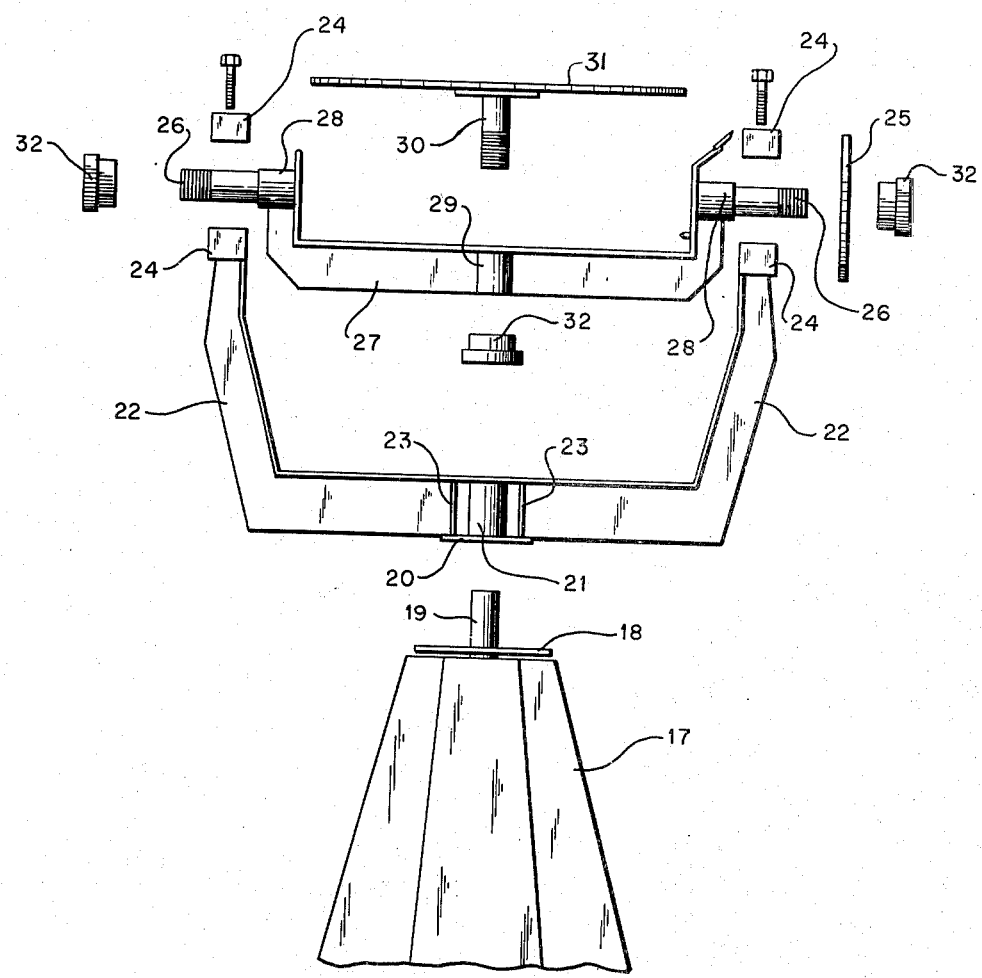

The exact nature of this invention as well as other objects and advantages thereof will be readily apparent on consideration of the following specification in relation to the annexed drawing in which:

Fig. 1 is a perspective view of a preferred embodiment of the present invention, and Fig. 2 is an exploded view of a portion of the device shown in Fig. 1 arranged to show certain details not visible in the showing of Fig. 1.

Referring now to the drawings wherein like reference characters designate like or corresponding parts throughout the several views, and particularly to Fig. 1, which illustrates a preferred embodiment, a base generally designated by the reference numeral 11 mounted for mobility on casters 12, and comprising two generally parallel elongated side members 13 and 14 interconnected by a centrally disposed cross plate 15, is adjustably positioned by means of the leveling jacks 16 to establish a true level position. A pedestal 17 is permanently secured to the central portion of the cross plate 15. A circular plate 18 preferably of a diameter slightly smaller than the top of the pedestal 17 is securely fastened thereto and is calibrated around its entire periphery, preferably in one degree increments for a full 360°. A stationary stub shaft not visible in Fig. 1 but shown and identified by reference numeral 19 in Fig. 2, is mounted securely upon and extends vertically above the center of the top of the pedestal 17 concentrically of the plate 18. A circular plate 20 slightly smaller than the plate 18 is combined with a cylindrical hub 21 and reinforcing webs 23 to form a base portion for a primary yoke assembly which also includes an opposed pair of symmetrically disposed upwardly swept arms 22. The hub 21 is a hollow tubular member of a length and inside diameter such that it fits rotatably upon the stub shaft 19, whereby the primary yoke is rotatably mounted upon the pedestal 17 for angular displacement about a vertical axis. The open upper end of each of the yoke arms 22 is fitted with a bearing assembly 24 with a horizontal bore therethrough, the respective bearings 24 being so arranged that the bores therethrough are aligned along a common horizontally disposed center line. A circular disk 25 calibrated about its entire periphery and preferably in one degree increments for the entire 360° is fixedly secured to one of the bearing assemblies 24 so that it is disposed concentric of the bearing and in a vertical plane.

Referring next to Fig. 2 for the best showing of the remainder of the structural details of the present invention, the two bearing assemblies 24 are arranged to rotatably support a pair of horizontally disposed stub shafts 26 each securely fastened to one of a pair of hubs 28 connected to the opposite ends of an elongated offset secondary yoke 27. In addition to the two horizontally disposed hubs 28, the secondary yoke 27 is provided with a third hub 29 located midway between the ends of the yoke 27 and disposed perpendicular to the hubs 28. The hub 29 is provided with a cylindrical bore therethrough perpendicular to the bores through the bearing assemblies 24 and arranged to rotatably support a stub shaft 30 which is fixedly secured to the center of a circular turntable 31. The circular turntable 31 is also calibrated along its periphery preferably in increments of one degree for the full 360° around its circumference. A suitable pointer is provided in fixed relation to the plate 20 of the primary yoke assembly for cooperation with the calibrations of the plate 18, and, in addition, pointers are fixedly secured to the secondary yoke for cooperation with the calibrations on the disk 25 and on the turntable 31, respectively. At all of the points of relative rotation of adjacent parts, specifically at stub shaft 19, stub shafts 26, and stub shaft 30, suitable locking means 32 are provided for threadable engagement with the respective stub shafts to retain the turntable in any desired position.

Finally, the circular turntable 31 is prepared for the attachment of equipment thereto, as by the provision of threaded holes therethrough for the fixed attachment of equipment during the pre-calibration procedure.

In operation, the unit described in detail above and shown best in its entirety in Fig. 1 is rolled into operating position adjacent an aircraft containing equipment to be precalibrated. Next, the turntable 31 is adjusted so that the pointer associated with the calibrated disk 25 indicates that the turntable is in a level position in relation to the primary yoke assembly. Thereafter, the leveling jacks 16 are adjusted until the spirit levels 50 attached to the turntable 31 indicate that the entire unit is in a true level position. With the unit adjusted in this manner, the position sensitive equipment to be pre-calibrated may be removed from the aircraft and be fixedly secured to the turntable 31 in the position shown in Fig. 1. In order to maintain the proper coordinated relationship between the equipment to be precalibrated the remainder of the equipment within the aircraft it is temporarily connected thereto by means of a suitable set of electrical conduits equivalent to and substituted for the connection normally used when the equipment is installed in the aircraft. A schematic representation of this relationship between the equipment to be calibrated and the remainder of the equipment within the aircraft is illustrated in Fig. 1 wherein the box designated by reference numeral 61 mounted upon the turntable 31 represents the position sensitive equipment to be calibrated, the box designated by reference numeral 62 represents the remainder of the automatic control system which remains installed in the aircraft, and the connecting means 63 interconnecting element 61 and 62 represents the required set of suitable electrical conduits temporarily interconnecting the portion 61 with the portion 62 of the system. For the purpose of pre-calibration, the equipment attached to the turntable may be rotated through 360° in any direction about three mutually perpendicular axes and may be positively retained in any position in which it is placed. In this manner, the universally adjustable equipment supporting means contemplated by this invention may be manipulated to simulate the various types of angular displacement to which the equipment will be subjected during various flight maneuvers, and the equipment may be placed and retained in positions corresponding to various flight attitudes assumed by an aircraft in actual flight. During such manipulations of the equipment supporting unit, the corresponding positions assumed by the control surfaces of the aircraft in response to such manipulations may be checked by direct comparison in order to determine whether or not the position sensing component of the automatic control system installed in the aircraft is accurately adjusted, and, if not, what type of adjustment is required. Hence, this device and the procedure for using it outlined herein is particularly useful during the preliminary checks and preliminary adjustment of a drone control assembly for an aircraft, in that it eliminates the need for a substantial amount of flight testing which would otherwise be necessary and which is much more expensive and time consuming in addition to the fact that is frequently subjects personnel involved therein to serious hazards particularly during the phase of operations involving these preliminary checks and adjustments.

It will be noted that the secondary yoke 27 is preferably offset from the horizontal axis about which it rotates by an amount sufficient to bring the center of gravity of equipment attached to turntable 31 as close as possible to the intersection of three mutually perpendicular axes about which the equipment is to be displaced. In the event that equipment to be pre-calibrated varies substantially from the usual shape and size, the yoke 27 may be replaced with a modified member to accommodate such equipment.

Thus, the present invention provides equipment for simplified and expeditious ground pre-calibration of equipment normally installed in an aircraft and usually requiring flight tests for pre-calibration of this equipment.

Obviously many modifications and variations of the present invention are possible in the light of the above teachings. It is therefore to be understood that within the scope of the appended claims the invention may be practiced otherwise than as specifically described.

What is claimed is:

1. A mobile universally adjustable device for use in adjusting complex electronic equipment such as the automatic control system incorporated in drone aircraft, said device comprising a readily movable base assembly, adjustable leveling means attached to said base assembly and operable simultaneously to restrain said base assembly against movement and to place said base assembly in a true level position, a fixed supporting means attached to said base assembly and projecting upwardly therefrom, a plurality of interconnected articulated supporting elements connected to the upper end of said supporting means, an equipment supporting member adjustably supported by said articulated supporting elements and arranged to support position sensitive electronic equipment fixedly secured thereto, said equipment supporting member being universally adjustable through a full 360° about each of three mutually perpendicular axes into any desired position, and a plurality of readily releasable locking means operable to restrain the respective articulated supporting elements against relative displacement, whereby equipment fixedly secured to the equipment supporting member may be moved unrestrainedly in any direction and retained in any desired position for the purpose of making necessary adjustments to such equipment.

2. A device as described in claim 1, and, in addition, a plurality of full 360° reference means secured to said supporting means, to the respective articulated supporting elements, and to the equipment supporting member, and arranged to continuously indicate the sense and magnitude of relative displacement of the enumerated components, whereby the space position of equipment fixedly secured to said equipment supporting member is continuously indicated.

3. A device for use in pre-calibration of the automatic control system utilized in drone aircraft, said device comprising a pedestal equipped with leveling means whereby it may be adjusted to a true level position, a first stub shaft extending vertically from the top of said pedestal, a first circular scale calibrated in degrees and mounted on the top of the pedestal concentric with said first stub shaft, a primary yoke assembly disposed in a vertical plane and mounted on said first stub shaft by means of a first hub located centrally thereof for rotation through a full 360° range about a vertical axis to various pre-determined positions, indicator means mounted on said primary yoke in operative relationship to said first scale for use in accurately positioning said primary yoke relative to said pedestal, bearing means mounted on the open ends of the primary yoke and disposed in alignment on a horizontal axis perpendicular to the vertical axis about which the primary yoke rotates, a secondary yoke fitted with second and third axially aligned stub shafts projecting horizontally from second and third hubs at its open ends, said horizontal stub shafts being arranged to be rotatably mounted in said bearings for movement through a full 360° range, a second circular scale calibrated in degrees and mounted at one end of said primary yoke concentric with one of said horizontally disposed stub shafts, said second scale being arranged in operative relationship to a pointer fixedly attached to said secondary yoke for use in accurately positioning said secondary yoke relative to said primary yoke, a fourth hub located centrally of said secondary yoke and concentric about an axis perpendicular to that on which said horizontal stub shafts are aligned, a flat circular turntable having a fourth stub shaft projecting perpendicularly from its center and arranged to be rotatably mounted in the fourth hub on said secondary yoke for movement through a full 360° range, said turntable being calibrated along its periphery with a scale in degrees arranged in operative relationship to an indicator fixedly attached to said secondary yoke for use in accurately positioning said turntable relative to said second yoke, and a plurality of locking means attached to the stub shafts of the primary yoke, the secondary yoke, and the turntable, respectively, operable to positively restrain each of these parts against rotary motion relative to the part on which it is mounted.

4. Apparatus for ground pre-calibration of the position sensing component of complex electronic equipment such as the automatic control system incorporated in drone aircraft including an auxiliary electrical connecting means for temporarily operatively interconnecting the position sensing component and the rest of the system when the position sensing component is removed from an aircraft for ground pre-calibration and a mobile universally adjustable supporting assembly for temporarily supporting said position sensing component during ground pre-calibration thereof, said supporting assembly comprising a readily movable base assembly, adjustable leveling means attached to said base assembly and operable simultaneously to restrain said base assembly against movement and to place said base assembly in a true level position, a fixed supporting means attached to said base assembly and projecting upwardly therefrom, a plurality of interconnected articulated supporting elements connected to the upper end of said supporting means, an equipment supporting member adjustably supported by said articulated supporting elements and arranged to support the position sensitive component fixedly secured thereto, said equipment supporting member being universally adjustable through 360 degrees about each of three mutually perpendicular axes into any desired position, and a plurality of readily releasable locking means operable to restrain the respective articulated supporting elements against relative displacement, whereby the component fixedly secured to the adjustable supporting member may be moved unrestrainedly in any direction and retained in any desired position for the purpose of making necessary adjustments to the system into which it is connected.

5. Apparatus for use in ground pre-calibration of the position sensing component of an automatic control system utilized in drone aircraft including an auxiliary electrical connecting means for temporarily operatively interconnecting the position sensing component and the remainder of the control system when the position sensing component is removed from an aircraft and a portable universally adjustable supporting assembly for temporarily supporting the position sensing component during ground pre-calibration, said supporting assembly comprising a pedestal equipped with leveling means whereby it may be adjusted to a true level position, a first stub shaft extending vertically from the top of said pedestal, a first circular scale calibrated in degrees and mounted on the top of pedestal concentric with said first stub shaft, a primary yoke assembly disposed in a vertical plane and mounted on said first stub shaft by means of a first hub located centrally thereof for rotation through a full 360 degree range about a vertical axis to various predetermined positions, indicator means mounted on said primary yoke in operative relationship to said first scale for use in accurately positioning said primary yoke relative to said pedestal, bearing means mounted on the open ends of the primary yoke and disposed in alignment on a horizontal axis perpendicular to the vertical axis about which the primary yoke rotates, a secondary yoke fitted with second and third horizontally aligned stub shafts projecting horizontally from second and third hubs at its open ends, said horizontal stub shafts being arranged to be rotatably mounted in said bearings for movement through a full 360 degree range, a second circular scale calibrated in degrees and mounted at one end of said primary yoke concentric with one of said horizontally disposed stub shafts, said second scale being arranged in operative relationship to a pointer fixedly attached to said secondary yoke for use in accurately positioning said secondary yoke relative to said primary yoke, a fourth hub located centrally of said secondary yoke and concentric about an axis perpendicular to that on which said horizontal stub shafts are aligned, a flat circular turntable arranged to support a position sensitive component mounted thereon and having a fourth stub shaft projecting perpendicularly from its center rotatably mounted in the fourth hub on said secondary yoke for movement through a full 360 degree range, said turntable being calibrated along its periphery with a scale in degrees arranged in operative relationship to an indicator fixedly attached to said secondary yoke for use in accurately positioning said turntable relative to said secondary yoke, and a plurality of locking means attached to the stub shafts of the primary yoke, the secondary yoke, and the turntable, respectively, operable to positively restrain each of these parts against rotary motion relative to the part on which it is mounted, whereby the component fixedly secured to the adjustable supporting member may be moved unrestrainedly in any direction and retained in any desired position for the purpose of making necessary adjustments to the system into which it is connected.

References Cited in the file of this patent
UNITED STATES PATENTS

| | | |
|---|---|---|
| 1,258,597 | Mladinich | Mar. 5, 1918 |
| 2,110,343 | Taylor | Mar. 8, 1938 |
| 2,305,233 | Blaschke | Dec. 15, 1942 |
| 2,470,773 | Haskins | May 24, 1949 |
| 2,490,574 | Austin | Dec. 6, 1949 |
| 2,509,116 | Wakefield | May 23, 1950 |
| 2,538,640 | Click | Jan. 16, 1951 |
| 2,685,671 | Grimes | Aug. 3, 1954 |
| 2,705,421 | Arnold | Apr. 5, 1955 |